United States Patent Office 3,651,005
Patented Mar. 21, 1972

3,651,005
COATING COMPOSITIONS OF AZIRIDINYL ALKYL ACRYLATE OR METHACRYLATE ACRYLIC GRAFT COPOLYMERS
Aloysius N. Walus, Flint, Mich., assignor to E. I. du Pont de Nemours and Company, Wilmington, Del.
No Drawing. Filed Dec. 22, 1970, Ser. No. 100,829
Int. Cl. C08f 45/34, 45/36
U.S. Cl. 260—31.2
10 Claims

ABSTRACT OF THE DISCLOSURE

The lacquer coating composition consists essentially of a graft copolymer dissolved in an organic solvent wherein the backbone of the graft copolymer is of polymerized soft acrylic constituents of an alkyl acrylate or an alkyl methacrylate in which the alkyl groups have 4–24 carbon atoms, and the copolymer has grafted into the backbone through a coupling unit of an aziridinyl acrylate or an aziridinyl methylacrylate a side chain of relatively hard polymerized monomer units, such as alkyl acrylates or alkyl methacrylates having 1–3 carbon atoms in the alkyl groups, acrylonitrile, methacrylonitrile and the like. The composition forms a high quality coating which is particularly useful as an exterior finish for automobiles and trucks.

BACKGROUND OF THE INVENTION

This invention relates to a coating composition, and in particular, to a high quality lacquer coating composition of a graft copolymer.

Methyl methacrylate lacquers are well known in the art and have been utilized for coating the exterior of automobiles and trucks as shown in the Johnson Pats. U.S. 2,782,131 and U.S. 2,782,132, both issued Feb. 19, 1957; Evans U.S. 2,849,409, issued Aug. 26, 1958; Crissey U.S. Pat. 2,934,509, issued Apr. 26, 1960, Evans et al. U.S. 3,060,148, issued Oct. 23, 1962 and Parker U.S. 3,477,969, issued Nov. 11, 1969. These compositions form excellent coatings for many uses but the automobile and truck manufacturing industry today needs coatings which have excellent adhesion, increased resistance to deterioration from weathering, increased resistance to solvent crazing and water spotting and increased scratch, mar and chip resistance.

Coating compositions have been prepared from copolymers containing aziridinyl acrylates or methacrylates as shown in Ashby et al. U.S. Pat. 3,480,601, issued Nov. 25, 1969, but these compositions do not have the improved superior physical properties required for exterior finishes for automobiles and trucks. The film-forming graft copolymers utilized in the novel coating composition of this invention wherein the aziridinyl acrylate or methacrylate is used as the coupling unit to form the graft copolymer have physical properties which are superior in adhesion in solvent craze resistance and water spot resistance to the aforementioned prior art coatings.

SUMMARY OF THE INVENTION

The lacquer coating composition of this invention comprises a solution of 10–50% by weight of a film-forming polymer dissolved in an organic solvent, in which the film-forming polymer has a number average molecular weight of about 20,000–200,000 and is a graft copolymer having a soft polymeric backbone segment and hard polymeric side chain segments, wherein (1) the polymeric backbone segment comprises 10–50% by weight of the copolymer and consists essentially of soft polymerized monomer units which can be either an alkyl acrylate, an alkyl methacrylate or mixtures thereof, wherein the alkyl groups have 4–24 carbon atoms;

(2) the polymeric side chain segments comprise about 90–50% by weight of the copolymer and are grafted into the polymer backbone segment through a coupling unit that is polymerized into the backbone and that has the formula

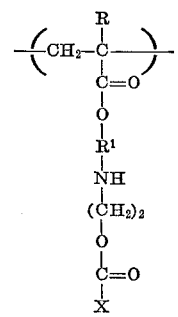

wherein R is either H or —CH$_3$; R$^1$ is an alkylene group having 1–8 carbon atoms; X is a hard polymer segment that has a number average molecular weight of 5,000–150,000 and consists essentially of polymerized units selected from the group consisting of alkyl acrylate, alkyl methacrylate, acrylonitrile, methacrylonitrile or mixtures thereof wherein the alkyl groups have 1–3 carbon atoms.

DESCRIPTION OF THE INVENTION

The novel coating composition of this invention is a lacquer containing preferably about 15–30% by weight of a film-forming polymer dissolved in an organic solvent. This particular lacquer composition has excellent physical properties, such as increased solvent craze resistance, water spot resistance, resistance to deterioration from weathering, chip resistance, scratch and mar resistance, excellent gloss and buffability. These characteristics make the lacquer particularly suitable for high quality finish for automobiles and trucks.

The graft copolymer utilized in the novel coating composition of this invention is prepared by first forming a prepolymer containing reactive carboxyl groups which is a side chain segment of the graft copolymer by using conventional polymerization techniques for the preparation of acrylic polymers. This prepolymer, the backbone monomer units and units of an aziridinyl compound are polymerized to form the graft copolymer. The aziridinyl compound reacts with the carboxyl group of the prepolymers and the resulting product polymerizes with the backbone monomer units to form the graft copolymer. The aziridinyl compound is the coupling unit which couples the prepolymer to the backbone of the polymer. The resulting polymer has a number average molecular weight of about 20,000–200,000; preferably, polymers are utilized that comprise 15–25% by weight of backbone segment, and correspondingly, 85–75% of the side chain segment and have a molecular weight of about 30,000–130,000.

The prepolymer is prepared by conventional polymerization techniques in which the monomer constituents are blended with solvents and a polymerization catalyst and heated to about 75–150° C. for about 2–6 hours to form a polymer of a molecular weight of about 5,000–150,000, and preferably, 20,000–100,000.

Typical solvents and diluents which are used to prepare this prepolymer are, for example, toluene, xylene, butyl acetate, acetone, methylisobutyl ketone, methylethyl ketone, butyl alcohol, hexane, Cellosolve, Cellosolve acetate and other aliphatic, cycloaliphatic, and aromatic hydrocarbons, esters, ethers, ketones and alcohols.

About 0.1–4% by weight, based on the weight of the monomers used to prepare the prepolymer, of a polymerization catalyst is used, such as ditertiary butyl peroxide, cumene hydroperoxide, azo-bis-isobutyronitrile.

One method for preparing the graft copolymer is to form a prepolymer that contains about 0.1–20% by weight of an α,β-unsaturated carboxylic acid. The free carboxyl reacts with the aziridinyl group of the aziridinyl compound. The ethylenically unsaturated portion of the aziridinyl compound reacts with the backbone monomer units to form the graft copolymer. Preferably, one mole of the aziridinyl compound is used per mole of prepolymer to form a high quality graft copolymer. Generally, the graft copolymer contains residual unreacted carboxylic acids. The amount of residual acid may be about 0.1–5% by weight of the resulting graft copolymer polymer. Typically useful α,β-ethylenically unsaturated carboxylic acids used to prepare this prepolymer are acrylic acid, methacrylic acid, crotonic acid, ethacrylic acid, itaconic acid and the like. Acrylic acid and methacrylic acid are preferred.

The technique that provides a high quality graft copolymer is to neutralize one of the carboxyl groups of the prepolymer with a basic compound and then react this prepolymer with the aziridinyl compound. The molar ratio of basic compound to carboxyl equivalent of prepolymer to aziridinyl compound is maintained at 1:1:1. The resulting product is then polymerized with the backbone monomers to form the graft copolymer. Typical basic compounds that can be used volatilize below 100° C. and are, for example, ammonia, ammonium hydroxide, primary amines, secondary amines, tertiary amines and polyamines, such as monoethanolamine, diethanolamine, diethylamine, triethylamine, methyldiethanolamine and the like.

It may be desirable to utilize only one carboxylic group per prepolymer chain, neutralize this carboxyl group with a basic compound and react this prepolymer with an aziridinyl compound to form the graft copolymer. This technique leaves no residual acid in the resulting graft copolymer. This can be accomplished by using azocyanopentenoic acid for preparing the prepolymer without using an ethylenically unsaturated acid constituent which results in a prepolymer terminated with one carboxyl group. This prepolymer is then neutralized and reacted, as indicated above, with the aziridinyl compound and with the backbone monomers to form the graft copolymer.

The graft copolymer is prepared by using the aforementioned polymerization techniques in which the constituents may be further blended with solvents and additional polymerization catalysts are added and the reaction mixture is heated to about 75–150° C. for about 2–6 hours to form the graft copolymer. The aforementioned polymerization catalysts are utilized and any of the aforementioned solvents can also be used to prepare the graft copolymer.

Typical monomer units which are used to form this hard prepolymer are alkyl acrylates and methacrylates in which the alkyl group has 1–3 carbon atoms, such as methyl methacrylate, propyl methacrylate, ethyl acrylate, propyl acrylate, acrylonitrile and methacrylonitrile. The monomers should be selected to provide the hard side chain segment preferably with a glass transition temperature of at least 60° C. and up to 110° C.

The following are typically useful soft constituents used to form the backbone of the copolymer. alkyl acrylates and alkyl methacrylates in which the alkyl group has 4–24 carbon atoms, preferably 4–12 carbon atoms, for example, butyl acrylate, hexyl acrylate, 2-ethylhexyl acrylate, nonyl acrylate, lauryl acrylate, stearyl acrylate, butyl methacrylate, isobutyl methacrylate, hexyl methacrylate, 2-ethylhexyl methacrylate, octyl methacrylate, nonyl methacrylate, lauryl methacrylate, stearyl methacrylate and the like. The monomers for the backbone segment should be selected to provide a soft backbone segment preferably with a glass transition temperature of 20° C. to as low as —100° C. Small amounts of any of the above monomers used for the side chain can be used in the backbone provided that the glass transition temperature remains within the above range.

The acrylic graft copolymers used to prepare the novel coating composition of this invention optionally can contain up to 20% by weight of the side chain segment or up to 50% by weight of the backbone segment of adhesion promoting acrylic monomers. Typical adhesion promoting monomers that can be used are aminohydroxy alkyl methacrylates and acrylates, such as aminohydroxy propyl methacrylate, aminohydroxy propyl acrylate, aminohydroxy ethyl methacrylate and the like; aminoalkyl methacrylates or acrylates, such as aminopropyl methacrylate, aminoethyl methacrylate, aminoethyl acrylate; ethylenically polymerizable oxazolidine compounds, such as 3-(2-methacryloxyethyl)-2,2-spirocyclohexyl oxazolidine.

The aziridinyl compound utilized in this invention to form the graft copolymer has the formula

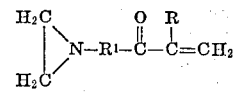

where R is H or —CH$_3$ and R$^1$ is an alkylene group having 1–8 carbon atoms. Typical aziridinyl compounds of this type are aziridinyl acrylates or methacrylates, such as 2-(1-aziridinyl) alkyl acrylate, such as 2-(1-aziridinyl) ethyl acrylate, 2-(1-aziridinyl) propyl acrylate, 2-(1-aziridinyl) butyl acrylate, 2-(1-aziridinyl)hexyl acrylate, 2-(1-aziridinyl) octyl acrylate, 2-(1-aziridinyl) ethyl methacrylate, 2-(1-aziridinyl) propyl methacrylate, 2-(1-aziridinyl) butyl methacrylate, 2-(1-aziridinyl) hexyl methacrylate, 2-(1-aziridinyl) octyl methacrylate. One particularly preferred compound is 2-(1-aziridinyl) ethyl methacrylate since it forms graft copolymers of high quality. Preferably, only 1 mole of the aziridinyl compound is utilized for 1 mole of the prepolymer in the process for forming the graft copolymer.

Preferably, about 1–30% by weight, based on the weight of the film-forming constituents, of a plasticizer can also be used in the composition, such as butylbenzyl phthalate, dibutyl phthalate, triphenyl phosphate, 2-ethylhexylbenzyl phthalate, dicyclohexyl phthalate, dibenzyl phthalate, butylcyclohexyl phthalate, mixed benzoic acid and fatty oil acid esters of pentaerythritol, poly(propylene adipate) dibenzoate, diethylene glycol dibenzoate, tetrabutylthiodisuccinate, butyl phthalyl, butyl glycolate, acetyltributyl citrate, dibenzyl sebacate, tricresyl phosphate, toluene ethyl sulfonamide, the di-2-ethylhexylester of hexamethylene diphthalate, di(methylcyclohexyl) phthalate.

Other plasticizers that can be used are epoxidized soya bean oil, oil-free and oil-modified alkyd resins and polyesters, such as polyethylene terephthalate esters, polyalkylene adipate esters, polyarylene adipate esters, polyesters of adipic acid/neopentyl glycol/benzoic acid, coconut oil/phthalic anhydride/ethylene glycol and the like.

The above plasticizers can readily be blended into the coating composition without changing the desirable physical characteristics of the coatings or finishes formed from the novel composition. Also, the resulting coating composition is stable for long periods of time. The finishes prepared from the novel composition have excellent flexibility, craze resistance, water spot resistance and gasoline resistance.

Pigments are used in the novel coating composition of this invention in the amounts of 0.1–20.0% by weight, and preferably, about 0.3–6.0% by weight of pigment, is used. Preferably, the pigment is formed into a mill base using conventional techniques and then blended with the lacquer. Examples of the great variety of pigments which are used in the novel coating composition of this invention are metallic oxides, preferably titanium dioxide, zinc oxide, and the like, metal hydroxides, metal flakes, metal powders, chromates, such as lead chromate, sulfides, sulfates, carbonates, carbon black, silica, talc, china clay, lead and iron blues, organic reds, maroons, organic dyes, lakes, etc.

The novel coating compositions of this invention can be applied to a variety of substrates, for example, primed and/or sealed metal substrates, wood, glass, plastics such as polypropylene, styrene, copolymers of styrene and the like, by any of the usual application methods, such as spraying, electrostatic spraying, dipping, brushing, flow coating and the like. These coatings can be air dried, but preferably, are baked at about 100–200° C. for about 10–60 minutes. The resulting coating is about 1–5 mils thick, preferably 1–3 mils thick and can be rubber or polished in accordance with conventional techniques, if desired, to improve smoothness or apparent gloss or both.

Preferably, the novel coating composition of this invention is applied over a suitably primed and sealed metal substrate. Typical alkyd primers or epoxy primers pigmented with iron oxide, carbon black, titanium dioxide and the like can be used. Typical sealers used over these primers are of epoxy/acrylic copolymers as disclosed in U.S. 3,509,086, issued Apr. 28, 1970.

The dried coatings of the composition of this invention are characterized by increased freedom from water spotting and have excellent craze resistance in combination with outstanding durability and weatherability and gloss retention. Coatings of this invention also have good gasoline resistance and resistance to aromatic solvents and excellent adhesion to primed metal substrates, particularly if an adhesion promoting monomer is used in the graft copolymer. To obtain excellent adhesion without these adhesion promoting monomers in the graft copolymers, a sealer coat is applied over the primed metal substrate.

The novel coating compositions of this invention find particular utility in coating articles, such as in the automobile and truck industry, which are mass produced. Also, with the coating compositions of this invention, unnoticeable repairs can be made wherein the repaired spot blends with adjacent areas.

The following examples illustrate this invention. The parts and percentages are by weight unless otherwise specified.

EXAMPLE 1

| Portion 1: | Parts by weight |
|---|---|
| Toluene | 1167.0 |
| Methylethyl ketone | 254.0 |
| Methyl methacrylate monomer | 2579.0 |
| Portion 2: | |
| Azocyano pentanoic acid | 10.0 |
| Toluene | 204.0 |
| Portion 3: | |
| Azocyano pentanoic acid | 12.0 |
| Toluene | 175.0 |
| Portion 4: | |
| Azocyano pentanoic acid | 12.0 |
| Cellosolve | 175.0 |
| Portion 5: | |
| Azocyano pentanoic acid | 6.0 |
| Cellosolve | 87.0 |
| Portion 6: | Parts by weight |
| Azocyano pentanoic acid | 5.5 |
| Cellosolve | 88.0 |
| Portion 7: | |
| Xylene | 1985.0 |
| Portion 8: | |
| Triethyl amine | 58.0 |
| Portion 9: | |
| 2-(1-aziridinyl) ethyl methacrylate | 87.5 |
| Butanol | 292.0 |
| Portion 10: | |
| Pelargonic acid | 35.0 |
| Portion 11: | |
| Acetone | 758.0 |
| Portion 12: | |
| 2-ethylhexyl acrylate | 753.0 |
| Azo-bis-isobutyronitrile | 7.5 |
| Portion 13: | |
| Azo-bis-isobutyronitrile | 4.4 |
| Portion 14: | |
| Azo-bis-isobutyronitrile | 3.0 |
| Portion 15: | |
| Toluene | 1257.0 |
| Total | 10,014.9 |

Portion 1 is charged into a polymerization vessel equipped with a stirrer and reflux condenser and heated to about 85° C. Portion 2 is charged into the vessel and the batch is brought to its reflux temperature by an exothermic reaction and held at its reflux temperature for 15 minutes. Portion 3 is then added and the reaction mixture is held at its reflux temperature for 10 minutes. Portion 4 is then added and the reaction mixture is held at its reflux temperature for 10 minutes. Portion 5 is added and the reaction mixture is held at its reflux temperature for 10 minutes. Portion 6 is added and the reaction mixture is held at its reflux temperature for 2 hours. Portion 7 is then added and immediately after the addition of Portion 7, Portions 8 and 9 are added and the reaction mixture is heated to its reflux temperature and held at this temperature for 1 hour. Portion 10 is then added and the reaction mixture is held at its reflux temperature for an additional hour. Portion 11 is added and the temperature of the reaction mixture is reduced to about 90° C. Portion 12 is then added and the reaction mixture is heated to its reflux temperature and held at this temperature for 1½ hours. Portion 13 is then added and the reaction mixture is held at its reflux temperature for 30 minutes. Portion 14 is then added and the reaction mixture is held at its reflux temperature for 1½ hours. Portion 15 is added and the polymer solution is cooled to room temperature.

The resulting polymer solution has a polymer solids content of about 34%, the relative viscosity of the polymer is 1.330 measured at 0.5% polymer solids in an ethylene dichloride and the polymer has an acid number of 1.4. The polymer solution has a Gardner-Holdt viscosity at 25° C. of Z.

Four coating compositions are formulated with the above prepared polymer solution using 0, 5, 10 and 20% by weight of a plasticizer. The plasticizer is an alkyd resin of coconut oil/ethylene glycol phthalate. Conventional solvents are used to dilute the compositions to a viscosity which can be applied by a doctor blade. Each of the above prepared coating compositions are applied to a steel substrate primed with a standard iron oxide alkyd primer composition. A doctor blade is used to apply a film which after baking at 150° C. for 30 minutes gives a film about 2 mils in thickness. The resulting films have excellent clarity, good gloss, and excellent water spot resistance and solvent crazing resistance.

EXAMPLE 2

| Portion 1: | Parts by weight |
|---|---|
| Cellosolve | 170.0 |
| Toluene | 250.0 |
| Butanol | 250.0 |
| Methyl methacrylate | 250.0 |
| Methacrylic acid | 15.0 |
| Portion 2: | |
| Methyl methacrylate | 150.0 |
| Methacrylic acid | 13.0 |
| Azo-bis-isobutyronitrile | 4.0 |
| Portion 3: | |
| Methyl methacrylate | 80.0 |
| Methacrylic acid | 12.0 |
| Azo-bis-isobutyronitrile | 2.0 |
| Portion 4: | |
| Azo-bis-isobutyronitrile | 1.0 |
| Portion 5: | |
| Azo-bis-isobutyronitrile | 1.0 |
| Portion 6: | |
| Triethylamine | 8.0 |
| Portion 7: | |
| 2-(1-aziridinyl) ethyl methacrylate | 8.0 |
| Lauryl methacrylate | 120.0 |
| Methyl methacrylate | 152.0 |
| Portion 8: | |
| Acetone | 300.0 |
| Portion 9: | |
| Azo-bis-isobutyronitrile | 1.0 |
| Portion 10: | |
| Azo-bis-isobutyronitrile | 0.5 |
| Portion 11: | |
| Azo-bis-isobutyronitrile | 0.5 |
| Isopropyl alcohol | 220.0 |
| Ethylene imine | 18.0 |
| Portion 12: | |
| Azo-bis-isobutyronitrile | 0.5 |
| Total | 2026.5 |

Portion 1 is charged into a reaction vessel equipped with a stirrer and a reflux condenser and the reaction mixture is heated to its reflux temperature. Portion 2 is added over a 30-minute period while the reaction mixture is held at its reflux temperature. Portion 3 is slowly added over a 30-minute period while the reaction mixture is held at its reflux temperature for 15 minutes. Portion 4 is added and the reaction mixture is held at its reflux temperature for 15 minutes. Portion 5 is added and the reaction mixture is held at its reflux temperature for 15 minutes. Portion 6 is added and Portion 7 is added immediately after Portion 6. The reaction mixture is held at its reflux temperature for about 1 hour. Portion 8 is added and the temperature is lowered to about 80° C. and Portion 9 is added immediately and the reaction mixture is held at its reflux temperature for an additional 2 hours. Portion 10 is added and the reaction mixture is held at its reflux temperature for ½ hour. Portion 11 is added and the reaction mixture is held at its reflux temperature for 45 minutes. Portion 12 is then added and the reaction mixture is held at the reflux temperature for an additional 20 minutes.

The resulting polymer solution has a total polymer solids of 37.6%, and a Gardner-Holdt viscosity at 25° C. of W+⅓. The polymer has a relative viscosity of 1.178 measured at 0.5% polymer solids in ethylene dichloride at 25° C. and has an acid number of less than 1.

A 2 mil film is applied to a metal substrate primed with an iron oxide alkyd resin primer and baked for 30 minutes at 150° C. The resulting film has excellent clarity, good gloss, excellent water spot resistance, good cold crack resistance and good solvent craze resistance.

A film is applied over a steel sheet primed with a sheet metal alkyd dip primer and baked as above. The film has excellent adhesion over this primer, which is surprising since many coating compositions generally do not have good adhesion to these types of primers without the use of a special sealer coat.

The above prepared polymer solution is blended with about 5% by weight of a standard alkyd plasticizer of ethylene glycol/coconut oil/phthalic acid and is compatible with this plasticizer which indicates that this composition is useful as an exterior finish for automobiles and trucks. A film of this composition is applied over a steel sheet primed as above and baked for 30 minutes at 150° C. The resulting film has excellent physical properties similar to those listed for the above finish.

EXAMPLE 3

| Portion 1: | Parts by weight |
|---|---|
| Xylene | 200.0 |
| Toluene | 150.0 |
| Butanol | 180.0 |
| Portion 2: | |
| Methyl methacrylate | 450.0 |
| Methacrylic acid | 30.0 |
| Azo-bis-isobutyronitrile | 4.8 |
| Portion 3: | |
| Azo-bis-isobutyronitrile | 1.0 |
| Portion 4: | |
| Azo-bis-isobutyronitrile | 1.0 |
| Portion 5: | |
| Triethylamine | 6.0 |
| Portion 6: | |
| 2-(1-aziridinyl) ethyl methacrylate | 6.0 |
| 2-ethylhexyl acrylate | 114.0 |
| Portion 7: | |
| Acetone | 200.0 |
| Portion 8: | |
| Azo-bis-isobutyronitrile | 0.5 |
| Portion 9: | |
| Azo-bis-isobutyronitrile | 0.5 |
| Portion 10: | |
| Propyleneimine | 22.0 |
| Total | 1365.8 |

Portion 1 is charged into a polymerization vessel equipped with a stirrer and a reflux condenser and heated to its reflux temperature. Portion 2 is charged into the reaction vessel over a 1-hour period and held for 15 minutes at its reflux temperature. Portion 3 is added and the reaction mixture is held at its reflux temperature for an additional 15 minutes. Portion 4 is then added and the reaction mixture is held at its reflux temperature for an additional 30 minutes. Portion 5 is added and Portion 6 is added immediately after Portion 5. Portion 7 is added immediately after Portion 6 and the temperature reduces to 80° C. Portion 8 is then added immediately and the reaction mixture is heated to its reflux temperature and maintained at this temperature for 1½ hours. Portion 9 is then added and the reaction mixture is held at its reflux temperature for an additional hour. Portion 10 is then added and the reaction mixture is held at its reflux temperature for another hour.

The resulting polymer solution has a total polymer solids content of 45.0%, a Gardner-Holdt viscosity at 25° C. of about Z and the polymer has a relative viscosity of 1.164 measured at 0.5% polymer solids in ethylene dichloride at 25° C. and has an acid number of about 1.0.

A mill base is prepared by blending the following ingredients:

| Portion 1: | Parts by weight |
|---|---|
| Polymer solution (prepared above) | 50 |
| Ethylene glycol diacetate | 21 |
| Cellosolve acetate | 15 |
| Xylene | 69 |
| Portion 2: | |
| Titanium dioxide pigment (rutile pigment) | 347 |
| Xylene | 60 |
| Total | 562 |

Portion 1 is charged into a mixer and is thoroughly blended. Portion 2 is then added and the mixture is thoroughly blended for 30 minutes. The mixture is then charged into a conventional sand mill and ground to a 0.1 mill fineness.

A lacquer is prepared by blending the following ingredients:

| | Parts by weight |
|---|---|
| Mill base (prepared above) | 230 |
| Polymer solution (prepared above) | 130 |
| Xylene | 72 |
| Total | 432 |

The above lacquer is diluted to a spray viscosity using a conventional lacquer thinner and is sprayed onto a steel panel primed with a high pigment volume primer surfacer which has been sanded to a smooth surface. The panel is baked at 165° C. for about 30 minutes. The resulting coating is about 2.5 mils thick. The coating has an excellent gloss and appearance, excellent solvent resistance, particularly to gasoline, and has excellent water spot resistance and solvent craze resistance. This lacquer can be utilized as a topcoat for automobiles and trucks.

What is claimed is:

1. A coating composition comprising a solution of 10–50% by weight of a film-forming polymer in an organic solvent wherein the film-forming polymer has a number average molecular weight of 20,000–200,000 and consists essentially of a graft copolymer having a soft polymeric backbone segment and hard polymeric side chain segments wherein
   (1) the polymeric backbone segment comprises 10–50% by weight of the copolymer and consists essentially of polymerized monomer units selected from the group consisting of an alkyl acrylate, alkyl methacrylate and mixtures thereof in which the alkyl groups have 4–24 carbon atoms;
   (2) the polymeric side chain segments comprise 90–50% by weight of the copolymer and are grafted into the backbone segment through a coupling unit that is polymerized into the backbone and has the formula

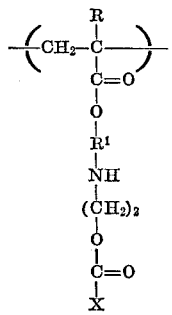

where R is selected from the group consisting of H and —$CH_3$; $R^1$ is an alkylene group of 1–8 carbon atoms; X is a hard polymer segment having a number average molecular weight of 5,000 to 150,000 and consists essentially of polymerized units selected from the group consisting of an alkyl acrylate, and alkyl methacrylate in which the alkyl groups have 1–3 carbon atoms, acrylonitrile, methacrylonitrile and mixtures thereof.

2. The coating composition of claim 1 containing 15–30% by weight of a film-forming polymer, 0.1–20% by weight pigment and 1–30% by weight of an organic plasticizer.

3. The coating composition of claim 2 in which the graft copolymer has a number average molecular weight of about 30,000 to 130,000 and the backbone segment comprises 15–25% by weight of the copolymer and the side chain segment has a number average molecular weight of 20,000–100,000 correspondingly comprises 75–80% by weight of the copolymer.

4. The coating composition of claim 3 in which R is —$CH_3$ and $R^1$ is an alkylene group having 2 carbon atoms.

5. The coating composition of claim 4 in which the soft backbone segment has a glass transition temperature of about 20 to —100° C. and the hard side chain segment has a glass transition temperature of about 60 to 110° C.

6. The coating composition of claim 5 in which the backbone segment is selected from the group consisting of an alkyl acrylate, an alkyl methacrylate and mixtures thereof having 4–12 carbon atoms in the alkyl groups and the side chain segment is selected from the group consisting of methyl methacrylate, acrylonitrile, methacrylonitrile and mixtures thereof.

7. The coating composition of claim 4 in which the backbone segment consists essentially of 2-ethylhexyl acrylate and the side chain segment consists essentially of methyl methacrylate.

8. The coating composition of claim 4 in which the backbone segment consists essentially of lauryl methacrylate and the side chain segment consists essentially of methyl methacrylate.

9. The coating composition of claim 5 in which the backbone segment of the copolymer consists essentially of 2-ethylhexyl acrylate and the side chain segment consists essentially of methyl methacrylate.

10. A primed metal substrate coated with a dried coalesced layer of the coating composition of claim 1.

References Cited

UNITED STATES PATENTS 3,480,601 11/1969 Ashby _____ 260—89.1
3,511,897 5/1970 Endsley _____ 260—878

MORRIS LIEBMAN, Primary Examiner
P. R. MICHL, Assistant Examiner

U.S. Cl. X.R.

117—132 B; 260—31.4, 32.8, 33.4, 33.6, 882, 885

UNITED STATES PATENT OFFICE
CERTIFICATE OF CORRECTION

Patent No. 3,651,005  Dated March 21, 1972

Inventor(s) Aloysius N. Walus

It is certified that error appears in the above-identified patent and that said Letters Patent are hereby corrected as shown below:

Column 2, line 27, column 4, line 39, column 9, line 57, and column 10, line 20, delete " $-CH_3$ " and insert -- $CH_3$ --;

Column 4, lines 30-35, delete the formula and insert:

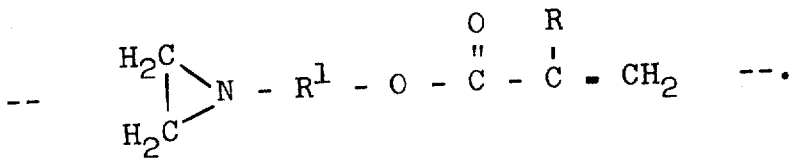

Signed and sealed this 5th day of December 1972.

(SEAL)
Attest:

EDWARD M. FLETCHER, JR.
Attesting Officer

ROBERT GOTTSCHALK
Commissioner of Patents